(12) United States Patent
Coenen et al.

(10) Patent No.: US 8,665,110 B2
(45) Date of Patent: Mar. 4, 2014

(54) TRANSMITTING ELECTRIC POWER INTO A BORE HOLE

(75) Inventors: Josef Guillaume Christoffel Coenen, Rijswijk (NL); Ivan Tan Boon Kiat, Rijswijk (NL)

(73) Assignee: Zeitecs B.V., Rijswijk (NL)

( * ) Notice: Subject to any disclaimer, the term of this patent is extended or adjusted under 35 U.S.C. 154(b) by 167 days.

(21) Appl. No.: 12/732,055

(22) Filed: Mar. 25, 2010

(65) Prior Publication Data

US 2011/0170320 A1 Jul. 14, 2011

Related U.S. Application Data

(60) Division of application No. 11/300,663, filed on Dec. 13, 2005, now abandoned, which is a continuation of application No. PCT/EP2004/051096, filed on Jun. 11, 2004.

(30) Foreign Application Priority Data

Jun. 13, 2003 (EP) .................................... 03253754

(51) Int. Cl.
*G01V 3/00* (2006.01)
(52) U.S. Cl.
USPC ....... 340/855.8; 340/855.7; 318/41; 166/372; 166/105.5
(58) Field of Classification Search
USPC .............. 340/854.9, 855–855.97; 363/34–35; 318/41, 400.21; 166/372, 105.5; 310/16.069
See application file for complete search history.

(56) References Cited

U.S. PATENT DOCUMENTS

| | | | |
|---|---|---|---|
| 4,901,069 A | 2/1990 | Veneruso | |
| 5,027,264 A | 6/1991 | DeDoncker et al. | |
| 5,207,273 A * | 5/1993 | Cates et al. | 166/369 |
| 5,208,740 A | 5/1993 | Ehsani | |
| 5,684,683 A | 11/1997 | Divan et al. | |
| 5,844,397 A | 12/1998 | Konecny et al. | |
| 5,847,550 A | 12/1998 | Schie et al. | |
| 6,043,995 A | 3/2000 | Leuthen | |
| 6,304,460 B1 | 10/2001 | Cuk | |
| 6,914,538 B2 * | 7/2005 | Baird et al. | 340/854.9 |

(Continued)

FOREIGN PATENT DOCUMENTS

| | | |
|---|---|---|
| GB | 2352150 A | 1/2001 |
| WO | WO-9515605 A1 | 6/1995 |
| WO | WO-0153656 A1 | 7/2001 |

OTHER PUBLICATIONS

D.R. Turner et al., "Electric Coiled Tubing Drilling: A Smarter CT Drilling System," Society of Petroleum Engineers, 1999, SPE/IADC Drilling Conference, pp. 231-243.

(Continued)

*Primary Examiner* — Albert Wong
(74) *Attorney, Agent, or Firm* — Patterson & Sheridan, L.L.P.

(57) ABSTRACT

A system for transmitting electric power into a bore hole, the system having an electric transmission line extending through the bore hole between an electric power source and a receiving station, wherein the receiving station includes frequency increasing means for increasing the frequency of the electric current supplied through the electric transmission line, voltage converter means for changing the voltage of the electric current supplied to it via the frequency increasing means, connecting means for supplying the frequency-increased electric current to the voltage converter means, and means for connecting an electric load to the receiving station.

26 Claims, 6 Drawing Sheets

(56) References Cited

U.S. PATENT DOCUMENTS

| | | | |
|---|---|---|---|
| 6,914,790 B2* | 7/2005 | Matsubara et al. | 363/34 |
| 6,923,273 B2 | 8/2005 | Terry et al. | |
| 6,995,683 B2 | 2/2006 | Smithson et al. | |
| 7,109,691 B2 | 9/2006 | Brooks et al. | |
| 7,164,242 B2* | 1/2007 | Federman et al. | 318/400.21 |
| 7,425,806 B2* | 9/2008 | Schnetzka et al. | 318/41 |
| 7,436,684 B2 | 10/2008 | Dermark | |
| 7,439,821 B2 | 10/2008 | Schulman et al. | |
| 7,701,106 B2* | 4/2010 | Yuratich | 310/216.069 |
| 7,708,059 B2* | 5/2010 | Shaw | 166/105.5 |
| 7,971,650 B2* | 7/2011 | Yuratich et al. | 166/372 |

OTHER PUBLICATIONS

Rik W.A.A. De Doncker et al., "A Three-Phase Soft-Switched High-Power-Density dc/dc Converter for High Power Applications," IEEE Transactions on Industry Applications, vol. 27, No. 1, 1991, pp. 63-73.

Ashoka K.S. Bhat et al., "A Three-Phase Series-Parallel Resonant Converter—Analysis, Design, Simulation, and Experimental Results," IEEE Transactions on Industry Applications, vol. 32, No. 4, 1996, pp. 951-960.

Ozpineci et al.—"Cycloconverters," 17 pages, date unknown.

\* cited by examiner

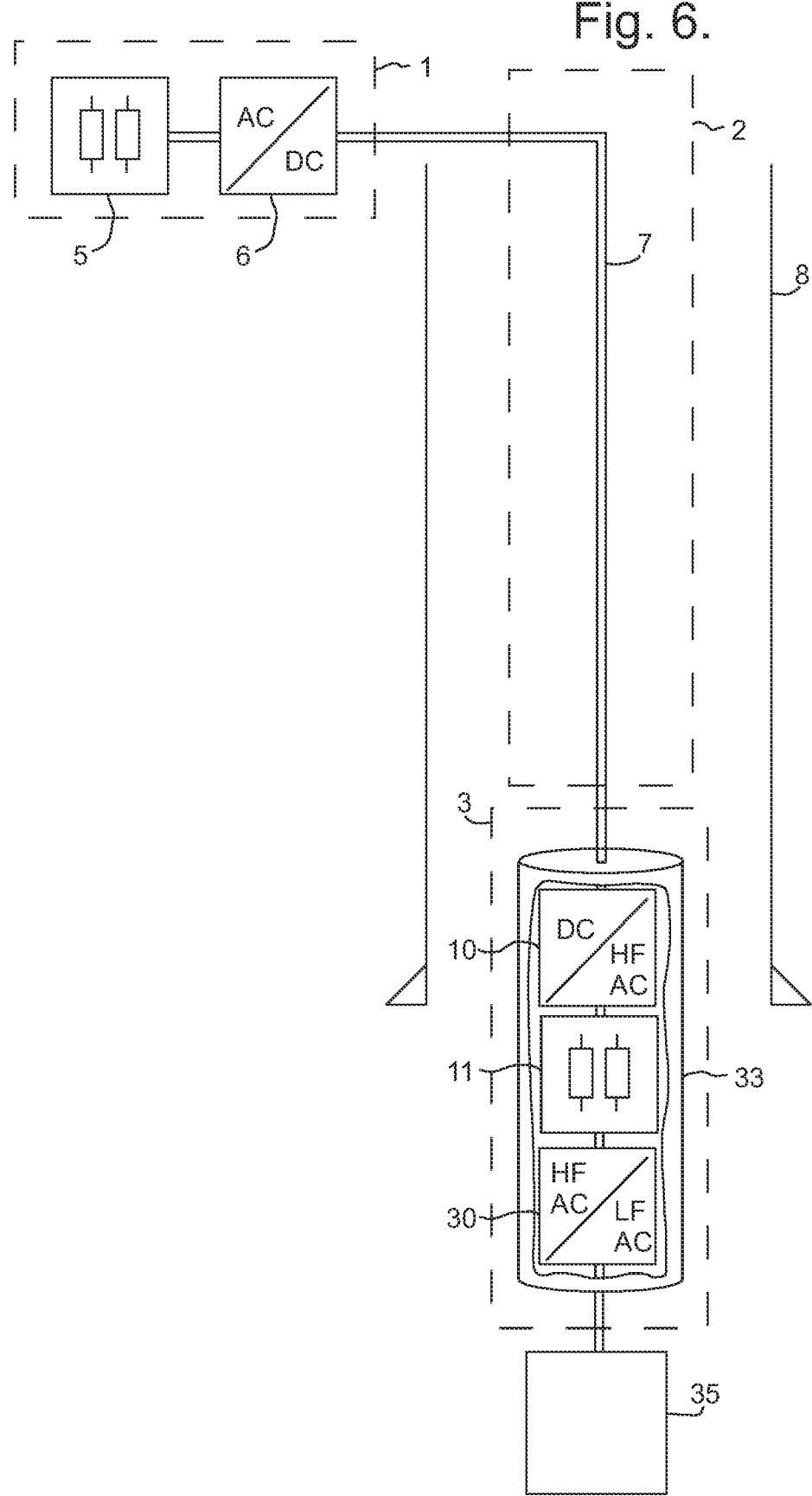

TRANSMITTING ELECTRIC POWER INTO A BORE HOLE

BACKGROUND OF THE INVENTION

1. Field of the Invention

The present invention relates to a system for transmitting electric power into a bore hole.

2. Description of the Related Art

Such a system is known and described in paper SPE/IADC 52791 of the Society of Petroleum Engineers, entitled "Electric coiled tubing drilling: a smarter CT drilling system" by D. R. Turner et. al. In the known system, an electrically powered bottom hole assembly is connected to an electric coiled tubing that reaches into a bore hole. The electric coiled tubing holds an electric transmission line, for powering a down hole electric DC motor. The peak power output of this motor is 28 HP, corresponding to some 21 kW.

This system is not considered suitable of transmitting much higher electric power at the motor voltage, for instance as high as 100 to 400 kW, since that would require very large cross section cable which would not fit in the coiled tubing. Moreover, such a cable would become so heavy that it would not be able to pull its own weight if it reaches into a typical bore hole suitable for production of hydrocarbons.

SUMMARY OF THE INVENTION

According to some embodiments of the invention, the system comprises an electric transmission line extending through the bore hole between an electric power source and a receiving station and voltage converter means for changing the voltage of the electric current supplied to the receiving station, wherein the receiving station includes frequency increasing means for increasing the frequency of the electric current supplied through the electric transmission line, connecting means for supplying the frequency-increased electric current to the voltage converter means, and means for connecting an electric load to the receiving station, that the frequency increasing means is arranged to convert the electric current into three subsignals of increased frequency, each of which is 120.degree. phase-shifted with respect to the other two, and whereby the voltage converter means change the voltage in each said subsignals, and that the frequency increasing means bring the frequency of the electric current to a value in a range of between 10 and 100 kHz.

BRIEF DESCRIPTION OF THE DRAWINGS

The invention will now be illustrated by way of example, with reference to the accompanying drawings wherein FIG. 1 schematically shows a wire line down hole power system for an AC load;

FIG. 6 schematically shows a wire line down hole power system for an AC electric motor.

DETAILED DESCRIPTION

Figure 1:
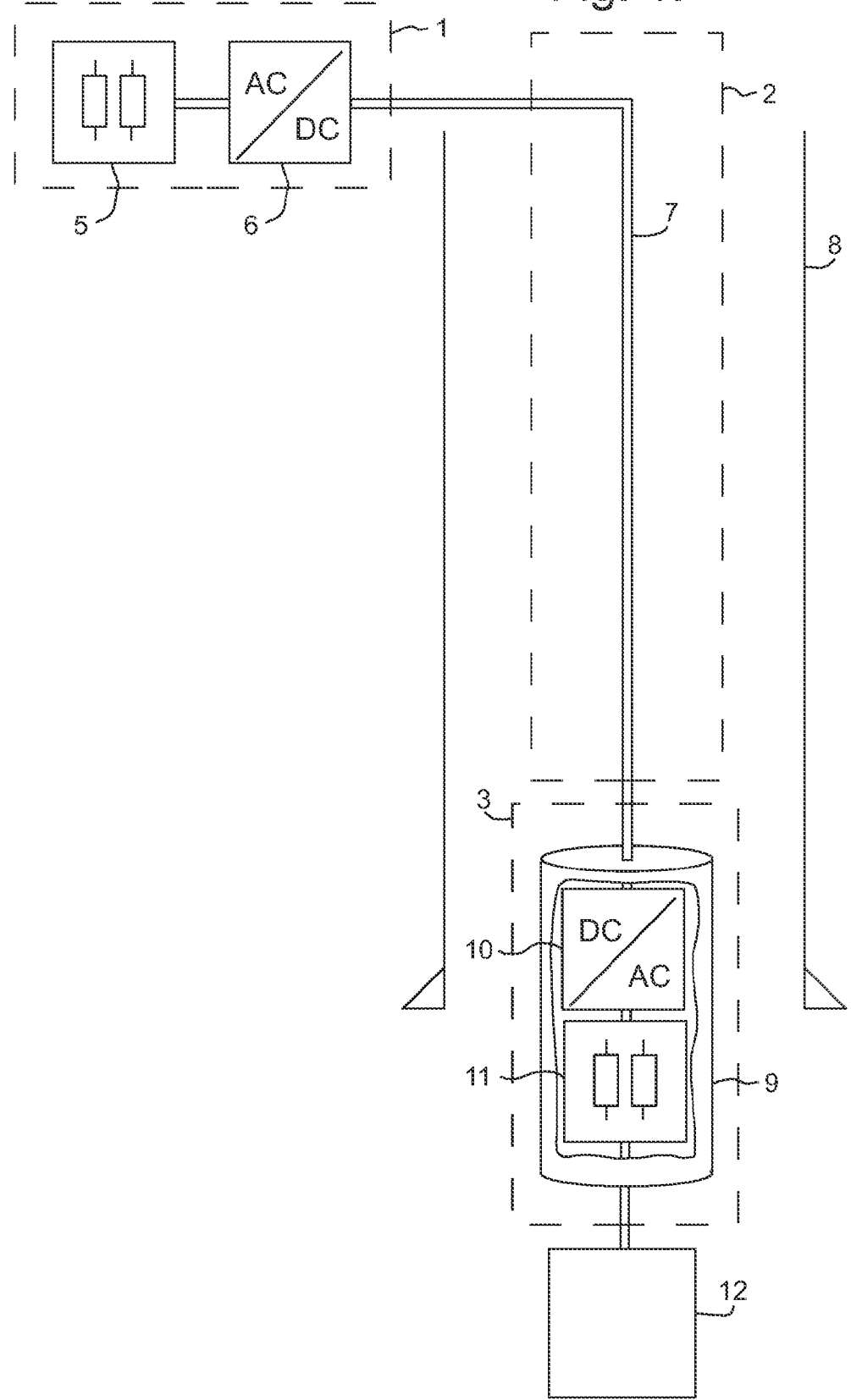

In the figures, like parts carry identical reference numerals.

In FIG. 1 a system for transmitting electric power into a bore hole is schematically shown. Elements of the system are grouped in groups (1), (2) and (3), whereby group (1) corresponds to elements associated with the power source, group (2) corresponds to the electric transmission line (2), and group (3) corresponds to elements in the receiver station. The electric power source is connected to the receiving station via an electric transmission cable 7. The bore hole is schematically represented by casing 8.

The electric power source in FIG. 1, which may typically be located on surface in the case that the bore hole reaches into an earth formation, comprises transformer means 5 for bringing the voltage of the electric current to be transmitted into the bore hole to a desired value, and a converter means 6, here shown in the form of a current rectifier, for lowering the frequency of the electric current. A current rectifier has a DC current as output.

The receiving station 9 comprises frequency increasing means 10, which is electrically connected to voltage converter means 11, here in the form of a coil transformer. The output of the voltage converter means 11 is connected to a load 12.

In practical operation, the system of FIG. 1 is typically fed with single phase or three-phase AC current having a 50 Hz or 60 Hz frequency and a relatively low voltage of less than approximately 1 kV. This is transformed in transformer 5 to a medium or voltage, of between 5 and 30 kV and rectified in rectifier 6 to a high DC voltage.

The electric transmission line 7 brings the DC electric power into the bore hole. In bore holes for production of hydrocarbon, the distance over which the electric transmission line 7 reaches can be between several hundreds of meters and 10 km. At the destination in the bottom of the bore hole, the electric current reaches the receiving station 9, where it its frequency is increased in frequency increasing means 10, and its voltage is brought back in voltage converter means 11 to typically between 100 and 800 V, preferably between 400 and 800 V, depending on what is required by the nature of load 12.

The frequency preferably lies in a range of between 10 and 100 kHz, in which range there is an optimum compromise between the quality of the frequency increased current and the miniaturisation of the voltage converter means. With a frequency of approximately 25 kHz, the voltage converter means in the form of a coil transformer can comfortably fit in a tube having a diameter of approximately 15 cm. This makes the frequency specifically suitable for application in a bore hole, particularly in a bore hole for production of hydrocarbons.

In the case of FIG. 1, the load 12 is supplied with electric power of the same frequency as the voltage converter means 11. For some applications this is appropriate, such as for electric power arc welding inside the bore hole.

The load can be a desired tool operating at a specified voltage. The presence of the voltage converter means in the receiving station allows for the voltage in the electric transmission line to be relatively high compared to the voltage desired for operating the load, which is beneficial for achieving the high power transmission through a suitable transmission line. Due to the presence of the frequency increasing means in the receiving station, this system makes it possible to combine a relatively low frequency electric current, preferably direct current, in the electric transmission line with a relatively high frequency electric current in the voltage converter means.

At relatively low frequency the reactive power loading in the transmission line is relatively low resulting in a high efficiency of power transmission. The size of typical transformers in inversely proportional to the current frequency, thus increasing the frequency allows for the use of a relatively small sized voltage converter means, such that it can fit in a typical bore hole suitable for production of hydrocarbons.

Preferably the voltage converter means comprises contactless transformer means. Such a contactless transformer may typically comprise inductively coupled primary and secondary coil windings, preferably coupled via a magnetisable core such as an iron core. Such a transformer is ideally suited for high frequency voltage transformation, because the efficiency increases with frequency such that its size can decrease with increasing frequency.

Optionally, the system further comprises frequency decreasing means 30 (FIG. 6), preferably including a current rectifier, for reducing the frequency of electric current supplied to it via the voltage converter means 11, and second connecting means for supplying the voltage-changed electric current to the frequency decreasing means. A number of loads require a relatively low frequency, or a direct current, for their operation, and for this reason the frequency decreasing means 30 can be provided.

Preferably, if the receiving station 33 comprises frequency decreasing means 30, the frequency decreasing means is then also arranged to convert three subsignals, each of which is 120° phase-shifted with respect to the other two, into one three phase current of reduced frequency.

In some other applications, however, the frequency must be decreased to several Hz or several tens of Hz, in particular 50 Hz or 60 Hz. An example is powering an AC powered electric motor 35.

Figure 2:
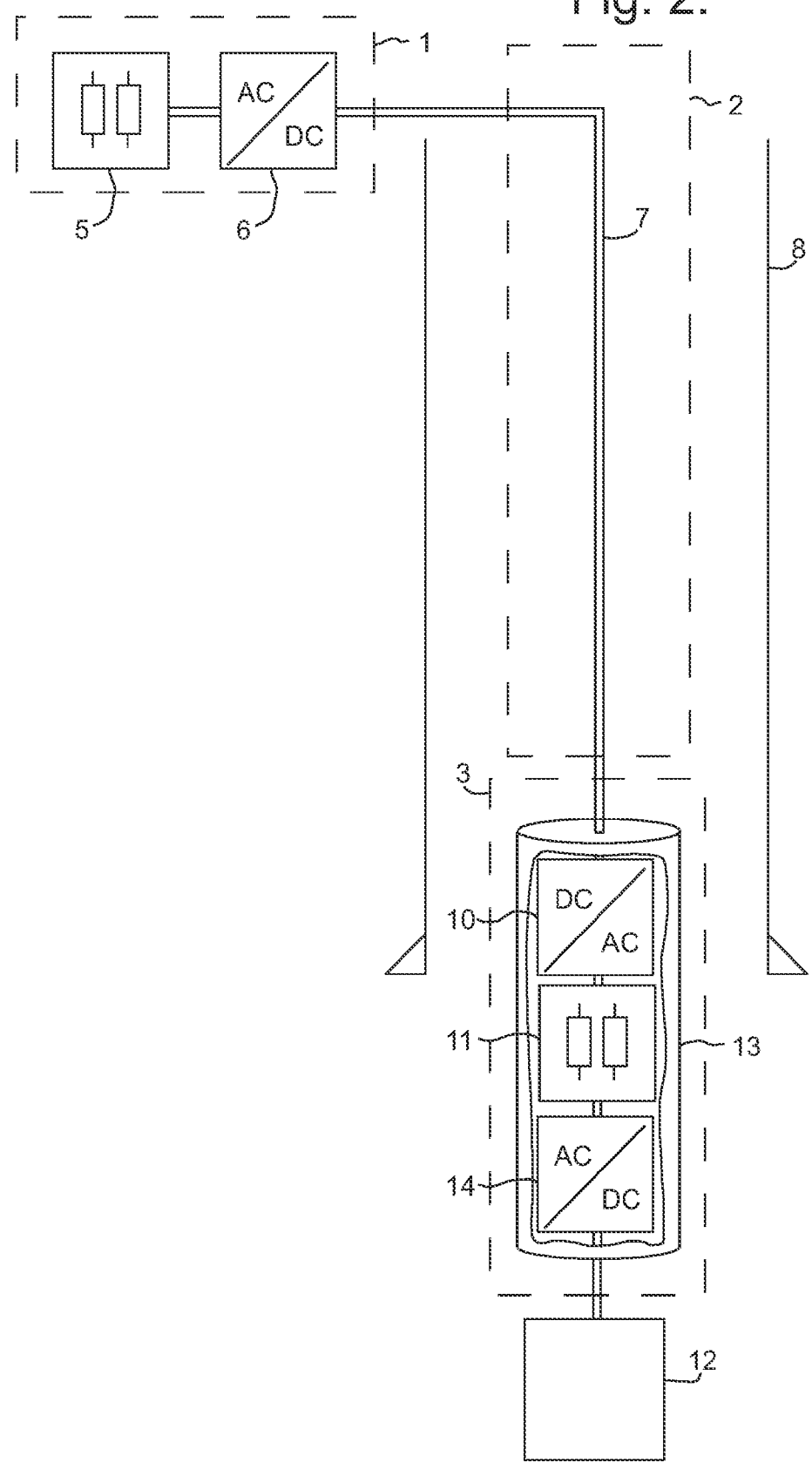
FIG. 2 schematically shows a wire line down hole power system for a DC load.

In other embodiments, the frequency must even be decreased to zero resulting in a DC current. A system for transmitting high power DC current in the bore hole is shown in FIG. 2. This system largely corresponds to the system described above and depicted in FIG. 1. The only difference is in the receiving station 13, where a current rectifier 14 is provided in series with the voltage converter means 11. Details of the current rectifier will be discussed further below.

Figure 5:
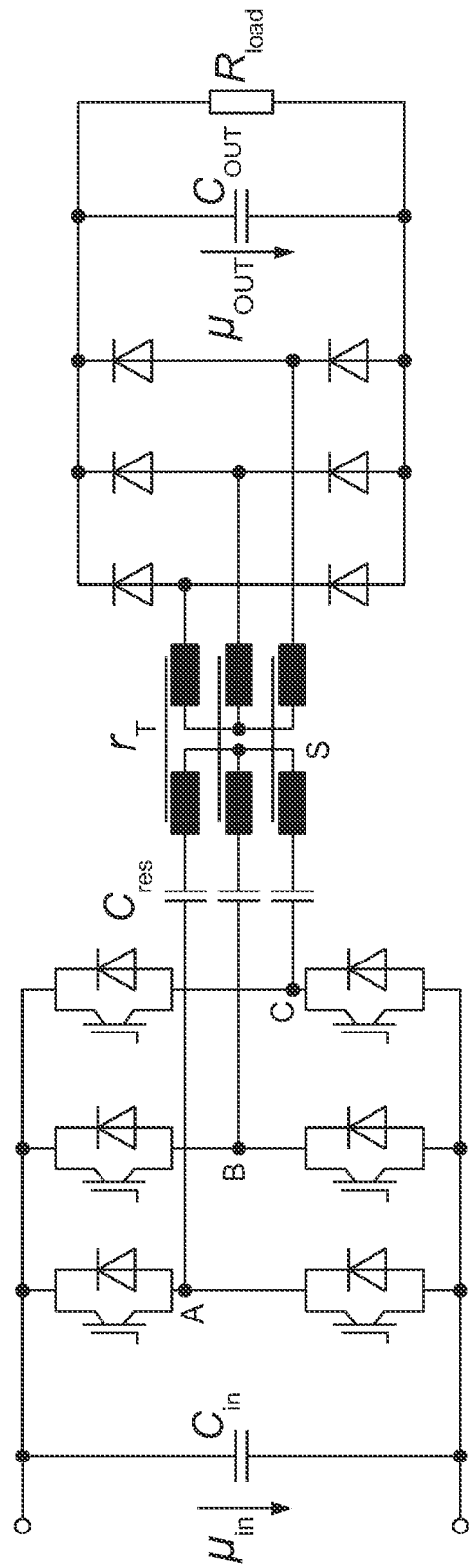
FIG. 5 schematically shows one example of a converter.

Functionally, the receiving station 13 equates to a DC to DC power converter. Examples of suitable DC to DC power converters are shown and described in, for instance, U.S. Pat. No. 5,027,264, an article an article entitled "A three-phase soft-switched high-power-density dc/dc converter for high-power applications" published in IEEE transactions on Industrial Applications, Vol. 27 No. 1 (January/February 1991) by R. W. A. A. De Doncker, D. M. Divan, and M. H. Kheraluwala, and an article entitled "A three-phase series-parallel resonant converter—analysis, design, simulation, and experimental results" published in IEEE transactions on Industrial Applications, Vol. 32 no. 4 (July/August 1999) by A. K. S. Bhat and R. L. Zheng. These DC to DC converters are incorporated by reference. Another example of a DC to DC converter is a three-phase series resonant converter as shown in FIG. 5. The input converter may consist of an input capacitor bank and a three-phase converter with IGBTs and freewheeling diodes. The output converter may consist of a diode rectifier in case only power flow from input to output is required.

The DC to DC converters generally have frequency increasing means composed of full or half bridges with active gate controlled switching devices which can be based on thyristor valves such as metal on semiconductor controlled thyristors (MCT's), or transistor valves such as insulated gate bipolar transistors (IGBT's), metal on semiconductor field effect transistors (MOSFET's). The DC to DC converters further have transformer means for changing the voltage of the increased frequency current, and a current rectifier.

The current rectifier can be based on a bridge of diodes, or active gate controlled switching devices comprising diodes. In the latter case, the DC to DC converter can be operated in two directions, since a bridge based on active gate controlled switching devices function as frequency increasing means in one direction and as current rectifier in the other direction. The advantage of a rectifier based on active gate controlled switching devices is therefore that the down hole power system can also function to transmit electric power out of the bore hole.

Figure 3:
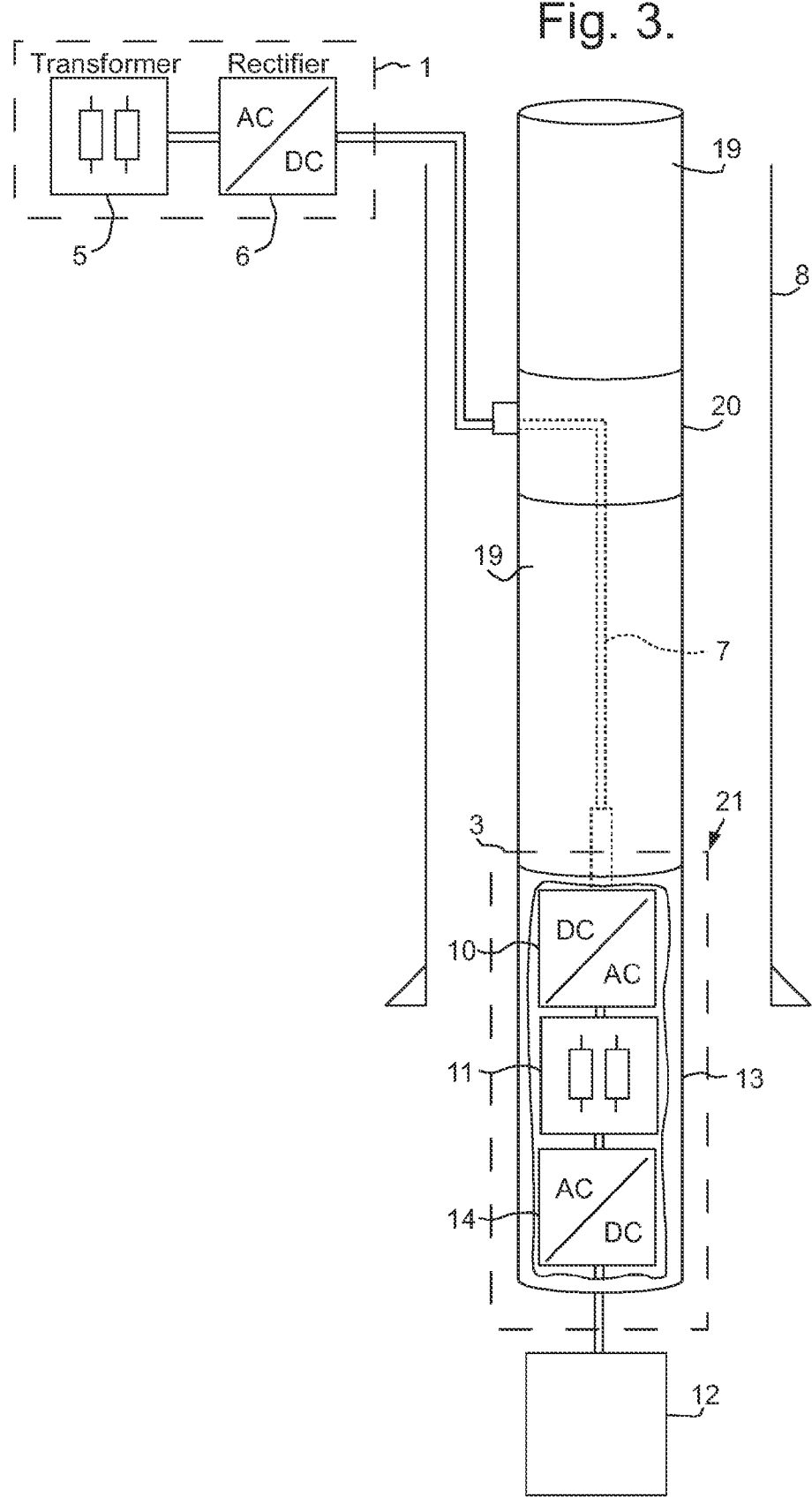
FIG. 3 schematically shows an electrical drill pipe and a down hole power system for a DC load.

FIG. 3 schematically shows a down hole power system in accordance with the invention incorporated in an electrical drill pipe 19. The receiving station is suitable for a DC load as in FIG. 2, but in the case of FIG. 3 it is connectable to the drill pipe via connector 21. The electric transmission line 7 is brought into the drill pipe 19 via side entry sub 20. In other aspects and in its operation, the electric power transmission system of FIG. 3 is the same as described above for FIG. 2.

In another embodiment, a bore hole is provided with the system in accordance with one of the above described embodiments, and wherein an electric load in the form of a tool is connected to the receiving station for receiving voltage changed electric current. The tool may include one or more of: an electric welding tool, oil-water separator, an induction coil or heating device in general, a perforating tool, a valve system, an electric sparking tool such as an electric spark drilling tool, a motor-driven tool such as a traction device or a drilling assembly, preferably including a drill bit, or an electric submersible pump.

As an alternative to FIG. 3, the electric power transmission system may be combined with coiled tubing technology analogous to the transmission line described in paper SPE/IADC 52791 of the Society of Petroleum Engineers, entitled "Electric coiled tubing drilling: a smarter CT drilling system" by D. R. Turner et. al.

Figure 4:
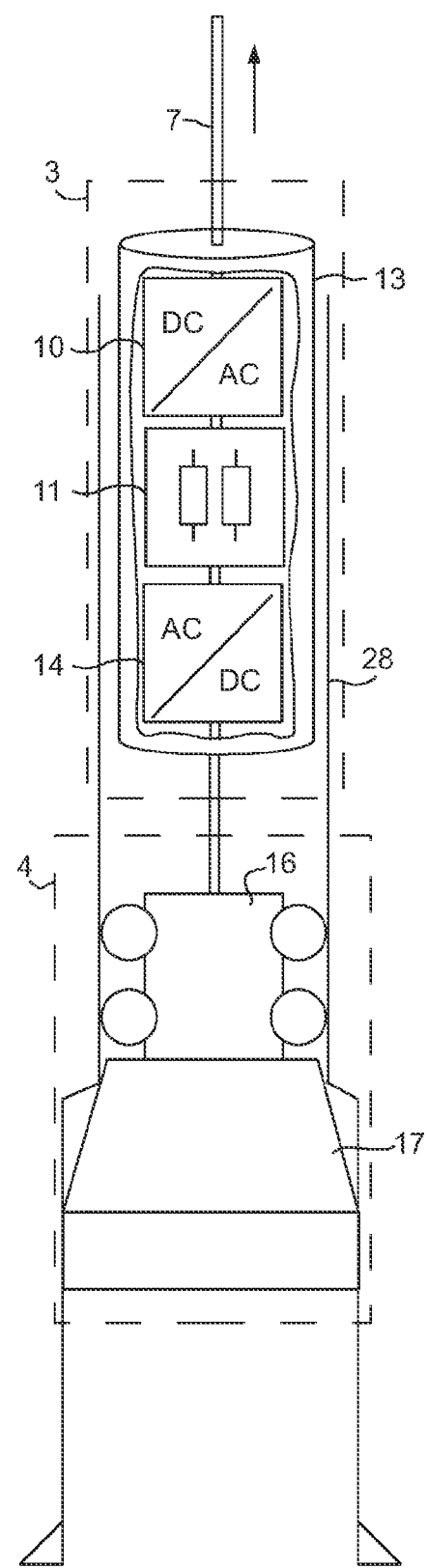
FIG. 4 schematically shows a bore hole with an electric powered motorised expander cone.

FIG. 4 shows schematically type of load in the form of a tool depicted in group (4) comprising an expansion cone 17 driven by an electrically DC powered traction device 16. This tool is moved upward through a casing tubing having a section 28 with a relatively narrow diameter in order to expand the casing tubing to a larger diameter to form expanded section 18.

Among other features that may be included in the drill bit are:

A gripping device for locking the tube once the arms have reached the fully expanded position by hydraulic actuation via the piston and tube. This way the bit is locked in expanded position. At the end of a bit run the bit can be collapsed by pulling the drilling assembly into the casing again. This pulling force should enable shear pins that hold the gripping device to fail so that the tube is released again and the bit opens and the under-reaming arms can move to the retracted position By virtue of the provision of the support means, the pivot means is relieved from taking the full torque load. It is thereby achieved that the pivot means is less vulnerable to damage due to transmission of high loads, without loosing reliability of switching the drill bit from the retracted to the expanded position and vice versa.

In another embodiment, the invention provides a hydraulic system for driving a pivoting movement of a pivotable tool arm between a radially retracted position and a radially expanded position, the hydraulic system comprising a cylinder and piston means slidably arranged in the cylinder forming a drive chamber on one side of the piston means and a return chamber on the other side of the piston means, the piston means having a forward and a rearward position in the cylinder whereby the piston means is activatable to its rearward position by causing the drive force acting on the piston as a result of pressure in the drive chamber to exceed the return force acting on the piston as a result of pressure in the return chamber, which piston means is coupled to the pivotable tool arm for driving the tool arm from the retracted position to the expanded position when the piston is driven into its rearward position, whereby the piston means is coupled to gate means with is arranged such that the return force acting on the piston as a result of pressure in the return chamber exceeds the drive force acting on the piston as a result of pressure in the drive chamber when the piston means is in or near its forward position whereas the opposite is the case when the piston means is in a position other than in or near its forward position.

When the tool arm is in its retracted position, the piston means can be positioned in or near its forward position where the gate means is switched such as to bias the piston means to its forward position. When the piston means is mechanically moved out of its forward position, the gate means is switched because it is coupled to the piston means, which results in the drive force acting on the piston as a result of pressure in the drive chamber exceeding the return force acting on the piston as a result of pressure in the return chamber. Consequently, the tool arm is pivoted to its expanded position and held in that position by the piston means. The starting situation, whereby the piston means is again biased in its forward position can be restored by mechanically forcing the piston means to its forward position, or by provision of additional gate means for regulating the pressures inside the drive chamber and return chamber such as to move the piston means forward on command.

Such a traction device requires more than 200 kW, or even between 300 and 500 kW, in order to expand a typical casing tubing at an industrially acceptable rate. The receiving station 13 functions in the same way as described above with reference to FIG. 2.

For some applications the power transmitted via the system to the destination inside the bore hole lies in a range of 50 to 500 kW, preferably 200 to 500 kW, depending on the type of operation or application. Such high electric power can be transmitted in a cable having only 1.5 mm$^2$ cross sectional area, provided that the voltage is sufficiently high. Preferably, the Ohmic resistance of the cable is less than 14 Ω/km, determined for DC at 20 C.

One example of a suitable cable is a commercially available HNOK cable from the firm Draka, which is a 8-mm diameter steel shielded coaxial power cable with a 1.5 mm$^2$ tin-plated copper central conductor that can conduct a current of 17 A DC. The insulation between the conductor and the steel shielding can support a potential difference of up to 20 kV between the conductor and the shielding. Thus a theoretical maximum power of 340 kW is transmittable using this cable. In practice the power is preferably limited to around 280 kW. A larger diameter core conductor and/or a thicker insulation layer will enable higher powers up to 500 kW.

In one embodiment, bypassing means are provided to feed to or extract from the electric transmission a data signal parallel to the receiving station. This enables utilization of the electric transmission line for carrying a data signal in addition to the high power transmission. Since such data signal does not have to be of high power, it does not need to pass through the receiving station.

The invention claimed is:

1. A method for transmitting electric power into a bore hole, the method comprising:
    transforming an AC power signal into an increased voltage AC power signal on surface;
    rectifying the increased voltage AC power signal into an increased voltage DC power signal on the surface;
    transmitting the increased voltage DC power signal into the bore hole via an electric transmission line to a receiving station located in the bore hole;
    inverting the increased voltage DC power signal to an increased voltage downhole AC power signal using the receiving station, wherein:
        the increased voltage downhole AC power signal comprises three subsignals, each of which is 120° phase-shifted with respect to the other two, and
        the increased voltage downhole AC power signal has a frequency in a range of between 10 and 100 kHz;
    transforming the increased voltage and high frequency downhole three phase AC power signal to a reduced voltage and high frequency downhole three phase AC power signal using the receiving station;
    converting the reduced voltage and high frequency downhole three phase AC power signal to a reduced voltage and low frequency downhole three phase AC power signal having a frequency of several Hz or several tens of Hz; and
    supplying the reduced voltage and low frequency downhole three phase AC power signal to an electric motor located in the bore hole using the receiving station, wherein:
        the motor is part of an electric submersible pump,
        the pump and receiving station are located within a bore of a bore hole tube,
        the pump produces hydrocarbons to the surface through the bore of the tube, and
        the electric transmission line extends from the surface to the receiving station through the bore of the tube.

2. The method of claim 1, wherein the surface AC power signal has a voltage of less than or equal to 1 kV and the increased voltage AC power signal has a voltage greater than or equal to 5 kV.

3. The method of claim 1, further comprising transmitting a data signal along the electric transmission line.

4. The method of claim 1, wherein the electric transmission line is a coaxial cable.

5. A system for transmitting electric power into a bore hole, the system comprising:
    an electric power source for locating at a surface of the bore hole and comprising:
        a transformer for transforming an AC power signal into an increased voltage AC power signal; and
        a rectifier for rectifying the increased voltage AC power signal into an increased voltage DC power signal;
    an electric transmission line for extending from the electric power source to a receiving station for transmitting the increased voltage DC power signal;
    the receiving station for locating in the bore hole and comprising:
        an inverter for inverting the increased voltage DC power signal to an increased voltage downhole AC power signal comprising three subsignals, each of which is 120° phase-shifted with respect to the other two, the increased voltage downhole AC power signal having a frequency in a range of between 10 and 100 kHz;
        a transformer for transforming the increased voltage and high frequency downhole three phase AC power signal to a reduced voltage and high frequency downhole three phase AC power signal; and
        a rectifier for converting the reduced voltage and high frequency downhole three phase AC power signal to a reduced voltage and low frequency downhole three phase AC power signal having a frequency of several Hz or several tens of Hz, wherein the receiving station is tubular and submersible; and an electric submersible pump for locating in the bore hole and comprising an AC powered motor for connecting to the receiving station and for receiving the reduced voltage and low frequency downhole three phase AC power signal, wherein an outer diameter of the receiving station and electric submersible pump is less than 15 cm for:
  positioning of the receiving station and electric submersible pump within a bore of a bore hole tube,
  producing hydrocarbons to the surface through the bore of the tube, and
  extension of the electric transmission line from the surface to the receiving station through the bore of the tube.

6. The system of claim 5, wherein the electric power source transformer is operable to input the surface AC power signal having a voltage of less than or equal to 1 kV and output the increased voltage AC power signal having a voltage greater than or equal to 5 kV.

7. The system of claim 5, further comprising a bypass operable to transmit a data signal along the electric transmission line.

8. The system of claim 5, wherein the electric transmission line is a coaxial cable.

9. A method for transmitting electric power into a bore hole, the method comprising:
  transforming an AC power signal into an increased voltage AC power signal on surface;
  rectifying the increased voltage AC power signal into an increased voltage DC power signal on the surface;
  transmitting the increased voltage DC power signal into the bore hole via an electric transmission line to a receiving station located in the bore hole;
  inverting the increased voltage DC power signal to an increased voltage and high frequency downhole AC power signal using the receiving station;
  transforming the increased voltage and high frequency downhole AC power signal to a reduced voltage and high frequency downhole AC power signal using a contactless transformer of the receiving station;
  converting the reduced voltage and high frequency downhole AC power signal to a reduced voltage and low frequency downhole AC power signal; and
  supplying the reduced voltage and low frequency downhole AC power signal to an electric motor located in the bore hole using the receiving station, wherein:
  the motor is part of an electric submersible pump,
  the pump and receiving station are located within a bore of a bore hole tube,
  the pump produces hydrocarbons to the surface through the bore of the tube, and
  the electric transmission line extends from the surface to the receiving station through the bore of the tube.

10. The method of claim 9, wherein the high frequency downhole AC power signal has a frequency in a range of between 10 and 100 kHz.

11. The method of claim 10, wherein the reduced voltage and low frequency downhole AC power signal has a frequency of several Hz or several tens of Hz.

12. The method of claim 9, wherein the surface AC power signal has a voltage of less than or equal to 1 kV and the increased voltage AC power signal has a voltage greater than or equal to 5 kV.

13. The method of claim 9, wherein the downhole AC power signal comprises three subsignals, each of which is 120° phase-shifted with respect to the other two.

14. The method of claim 9, further comprising transmitting a data signal along the electric transmission line.

15. The method of claim 9, wherein the electric transmission line is a coaxial cable.

16. A system for transmitting electric power into a bore hole, the system comprising:
  an electric power source for locating at a surface of the bore hole and comprising:
    a transformer for transforming an AC power signal into an increased voltage AC power signal; and
    a rectifier for rectifying the increased voltage AC power signal into an increased voltage DC power signal;
  an electric transmission line for extending from the electric power source to a receiving station for transmitting the increased voltage DC power signal;
  the receiving station for locating in the bore hole and comprising:
    an inverter for inverting the DC power signal to an increased voltage and high frequency downhole AC power signal;
    a contactless transformer for transforming the increased voltage and high frequency downhole AC power signal to a reduced voltage and high frequency downhole AC power signal and comprising inductively coupled primary and secondary coil windings; and
    a rectifier for converting the reduced voltage and high frequency downhole AC power signal to a reduced voltage and low frequency downhole AC power signal,
  wherein the receiving station is tubular and submersible; and
  an electric submersible pump for locating in the bore hole and comprising an electric motor for connecting to the receiving station and for receiving the reduced voltage and low frequency downhole AC power signal,
  wherein an outer diameter of the receiving station and electric submersible pump is less than 15 cm for:
    positioning of the receiving station and electric submersible pump within a bore of a bore hole tube,
    producing hydrocarbons to the surface through the bore of the tube, and
    extension of the electric transmission line from the surface to the receiving station through the bore of the tube.

17. The system of claim 16, wherein the inverter is operable to output the downhole AC power signal having a frequency in a range of between 10 and 100 kHz.

18. The system of claim 17, wherein the receiving station rectifier is operable to output the AC reduced voltage and frequency downhole power signal having a frequency of several Hz or several tens of Hz.

19. The system of claim 16, wherein the electric power source transformer is operable to input the surface AC power signal having a voltage of less than or equal to 1 kV and output the increased voltage AC power signal having a voltage greater than or equal to 5 kV.

20. The system of claim 16, wherein the inverter is operable to output the downhole AC power signal comprising three subsignals, each of which is 120° phase-shifted with respect to the other two.

21. The system of claim 16, further comprising a bypass operable to transmit a data signal along the electric transmission line.

22. The system of claim 16, wherein the electric transmission line is a coaxial cable.

23. The system of claim 16, wherein the system is operable to transmit the electric power at a rate greater than or equal to 200 kW.

24. The method of claim 1, wherein the electric power is transmitted at a rate greater than or equal to 200 kW.

25. The system of claim 5, wherein the system is operable to transmit the electric power at a rate greater than or equal to 200 kW.

26. The method of claim 9, wherein the electric power is transmitted at a rate greater than or equal to 200 kW.

\* \* \* \* \*